United States Patent
Tsai

(10) Patent No.: US 11,794,661 B1
(45) Date of Patent: Oct. 24, 2023

(54) TILT BUFFERING APPARATUS FOR A BICYCLE CARRIER FRAME AND BICYCLE CARRIER FRAME HAVING THE SAME

(71) Applicant: JYIN SHENG CO., LTD., Changhua County (TW)

(72) Inventor: Yu-Lung Tsai, Changhua County (TW)

(73) Assignee: JYIN SHENG CO., LTD., Changhua County (TW)

( * ) Notice: Subject to any disclaimer, the term of this patent is extended or adjusted under 35 U.S.C. 154(b) by 0 days.

(21) Appl. No.: 17/724,795

(22) Filed: Apr. 20, 2022

(51) Int. Cl.
*B60R 9/10* (2006.01)
*B62H 3/04* (2006.01)

(52) U.S. Cl.
CPC ............... *B60R 9/10* (2013.01); *B62H 3/04* (2013.01)

(58) Field of Classification Search
CPC .................................... B60R 9/10; B62H 3/04
USPC ....................................................... 224/42.12
See application file for complete search history.

(56) References Cited

U.S. PATENT DOCUMENTS

| | | | | |
|---|---|---|---|---|
| 5,529,231 A * | 6/1996 | Burgess | ............... | B60R 9/10 248/592 |
| 5,685,469 A * | 11/1997 | Stapleton | ............... | B60R 9/10 224/536 |
| 6,401,999 B1 * | 6/2002 | Hehr | ............... | B60R 9/06 224/508 |
| 6,485,243 B1 * | 11/2002 | Ferman | ............... | B60R 9/06 224/520 |
| 6,626,340 B1 * | 9/2003 | Burgess | ............... | B60R 9/10 224/570 |
| 10,399,506 B2 * | 9/2019 | Anderson | ............... | B60R 9/10 |
| 11,518,317 B2 * | 12/2022 | Oshman | ............... | B60R 9/06 |
| 11,584,306 B1 * | 2/2023 | Wallin | ............... | B60R 9/10 |
| 2008/0085176 A1 * | 4/2008 | Statkus | ............... | B60P 3/07 414/462 |
| 2011/0057008 A1 * | 3/2011 | Clausen | ............... | B60R 9/10 224/504 |
| 2017/0349110 A1 * | 12/2017 | Bass | ............... | B60R 9/10 |
| 2018/0072237 A1 * | 3/2018 | Kuschmeader | ............... | B60R 9/10 |
| 2018/0354427 A1 * | 12/2018 | Yazdian | ............... | B60R 9/10 |
| 2019/0161022 A1 * | 5/2019 | McFadden | ............... | B60R 9/10 |
| 2020/0406830 A1 * | 12/2020 | Owen | ............... | B60R 9/042 |

* cited by examiner

*Primary Examiner* — Peter N Helvey
(74) *Attorney, Agent, or Firm* — WPAT, P.C

(57) ABSTRACT

A bicycle carrier with a tilt cushion, including a frame body, a pair of position plates mounted on the bottom of the frame body and provided with a pivot hole, positioning hole and fixing hole. A buffer portion includes a buffer block and temporary fixing part, with the buffer block having a through hole aligned with the fixing hole of the position plates, and an inclined surface. A connecting rod includes a rod pivot hole and rod positioning hole, with a pivot pin passing through the rod pivot hole and fixing hole of the two position plates. A fastening bolt, removably passing through the fixing hole of the position plates and rod pivot hole. When the connecting rod is swung to a tilted position, the buffer portion is held against the connecting rod by the inclined surface.

8 Claims, 13 Drawing Sheets

TILT BUFFERING APPARATUS FOR A BICYCLE CARRIER FRAME AND BICYCLE CARRIER FRAME HAVING THE SAME

FIELD OF THE DISCLOSURE

The present disclosure relates in general to a bicycle carrier frame, and more particularly, to a bicycle carrier frame with a tilt buffering apparatus.

BACKGROUND OF THE DISCLOSURE

U.S. Pat. No. U.S. 9,987,998 discloses a bicycle carrier rack that can be folded for positioning, and has a loading mechanism for carrying the bicycle. When the main rod (fixing rod) is tilted, the fixing rod is positioned by the positioning block at the bottom of the main rod and the groove of the movable member. The positioning block at the bottom of the main rod, the groove and the blocking portion of the movable member are positioned against each other to form a structure that can be tilted and positioned. However, the aforementioned tilt positioning mechanism is a one-time change from an upright position to a tilt position. Therefore, when a bicycle is loaded, the overall weight will be very heavy. Also, in the process of the user tilting the main bar, if the user does not hold the main bar, the dumping force from the weight will be very large, which can injure the user, and/or break or cause damage to the blocking part.

U.S. Pat. No. 11,046,379 discloses a bicycle carrying frame and its joints for a vehicle that can prevent the main rod from falling rapidly. The entire frame body is provided with a loading mechanism that can be used to carry the bicycle. In this case, a joint is set between the entire frame body and the connecting rod, and the stroke of the main rod can be divided into multiple stages. In each stage, the main rod can be blocked so that it will not fall to the most tilted position at one time, which can effectively prevent the main pole from falling rapidly when it is inclined, and solve the problem that the aforementioned cases may injure people. However, in this case, for the positioning structure of the main rod in the tilted position, the interference rod is mainly used to act on the wall surface of the guiding hole dug by the upright plates. There is no object for buffer portioning between the interference rod and the straight plate. Therefore, after use in an extended period of time, there is still the possibility of deformation caused by friction or impact of the components.

SUMMARY OF THE DISCLOSURE

It is therefore an object of the present disclosure to provide a bicycle carrier frame with a tilt buffering apparatus, which can be provided with a buffer portion between a connecting rod and fastening bolt, so that a frame body will not directly impact the connecting rod after tilting by way of the fastening bolt acting on the buffer portion, thus providing a protective effect.

In order to achieve the above-mentioned purpose, the present disclosure proposes the bicycle carrier frame with the tilt buffering apparatus that includes a frame body with at least one carrier, which is used for carrying and fixing at least one bicycle; a pair of position plates having a connecting hole, a positioning hole and a fixing hole mounted on the bottom of the frame body, positioned opposite to one another, and separated by a predetermined distance; a buffer portion having an elongated body, with the elongated body having a buffer block and a temporary fixing part, whereby the buffer block has a through hole, the buffer portion is detachably located between the position plates, the through hole is aligned with the fixing hole of the two position plates, the temporary fixing portion is detachably fixed to the frame body or the position plates, and the buffer block has an inclined surface; a connecting rod having a rod pivot hole and a rod positioning hole, whereby a part of the connecting rod with the rod pivot hole is located between the position plates, and a pivot pin passes through the connecting hole of the position plates and the rod pivot hole, so that the connecting rod can be pivoted between the position plates; and a fastening bolt detachably penetrating the fixing hole of the position plates and passing through the through holes of the buffer block. Specifically, the frame body and the position plates are operated to swing relative to the connecting rod, so that the connecting rod is located in a use position or a tilted position relative to the two position plates. At the use position, the rod positioning hole of the connecting rod is opposite to the positioning hole of the pair of the position plates, and fixed by a positioning pin passing therethrough, so that the frame body and the two positioning plates cannot swing relative to the connecting rod, and at the same time, the inclined surface of the buffer block is separated without contact from the connecting rod by a predetermined distance, and when the connecting rod is at the tilted position, the buffer block is pressed against the connecting rod on the inclined surface.

Through the above-mentioned structure, the tilt buffering apparatus uses a buffer portion as arranged between the connecting rod and the fastening bolt, so that the frame body will not directly impact the connecting rod after tilting with the fastening bolt acting on the buffer portion, thus providing a protective effect.

Another object of the present disclosure is to provide a bicycle carrier frame with a tilt buffering apparatus using the buffer portion that can be stored on the bicycle carrier frame when not in use, without needing any additional storage space.

Preferably, the pair of position plates that is opposite to one another is provided with a stowed hole. The frame body has a receiving hollow part, and when the through hole of the buffer block is aligned with the stowed hole of the position plates, the stowed pin is passed through the stowed hole of the position plates and the through hole of the buffer block. The temporary fixing part of the buffer portion passes through the receiving hollow part to hook onto the frame body.

Also preferably, the through hole of the buffer block is passed through by the fastening bolt, which is fixed through the fixing hole of the position plates. The temporary fixing portion of the buffer portion has a through hole for the stowed pin to pass through the temporary fixing portion and the receiving holes of the position plates.

With the above technical features, the present disclosure can be accommodated between the two position plates when the buffer portion is not in use, and does not need to be accommodated separately by the bicycle carrier frame.

BRIEF DESCRIPTION OF THE DRAWINGS

In order to illustrate the technical features of the present disclosure in detail, an exemplary embodiment is illustrated with drawings, wherein.

DETAILED DESCRIPTION OF THE EXEMPLARY EMBODIMENTS

Figure 1:
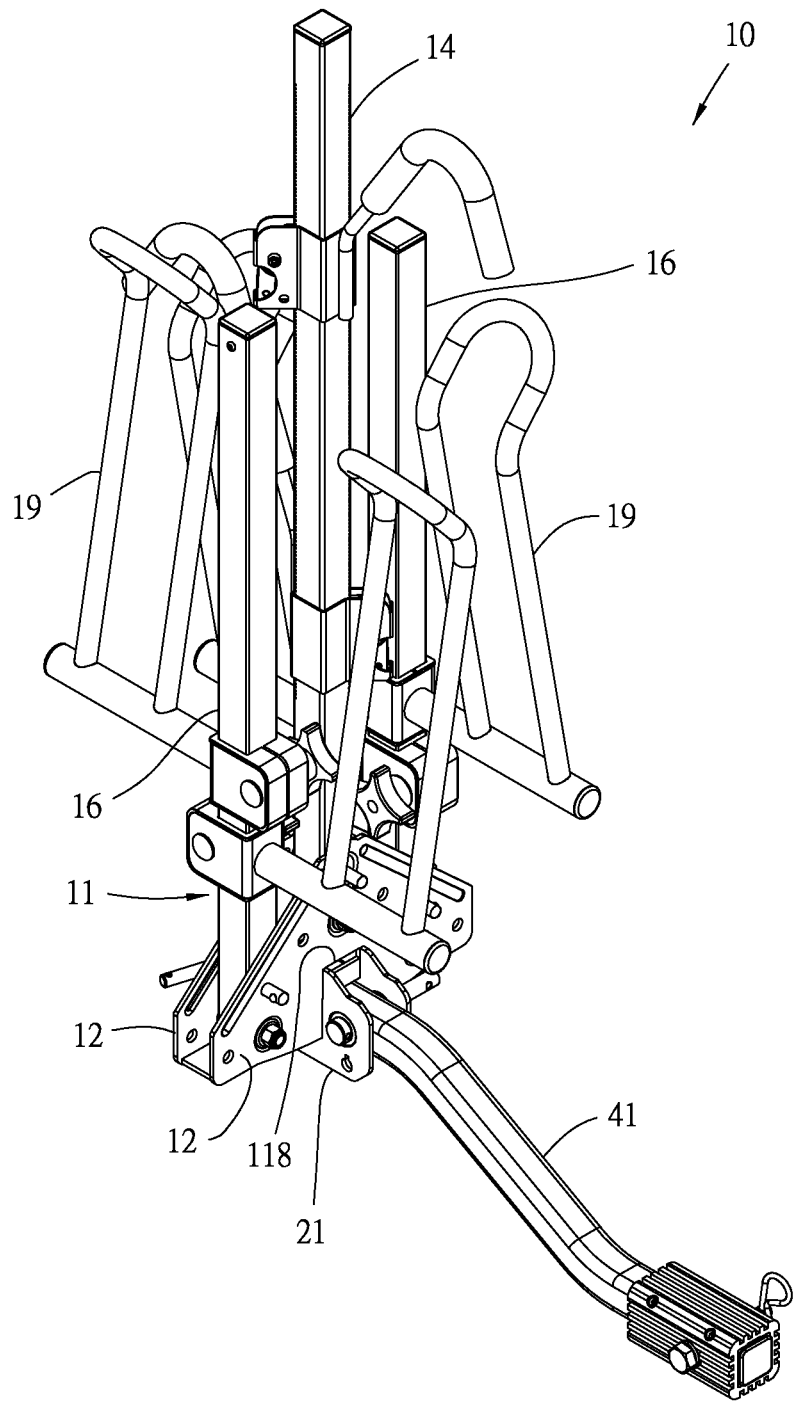
FIG. 1 is a perspective view of the first exemplary embodiment of the present disclosure.
Figure 2:
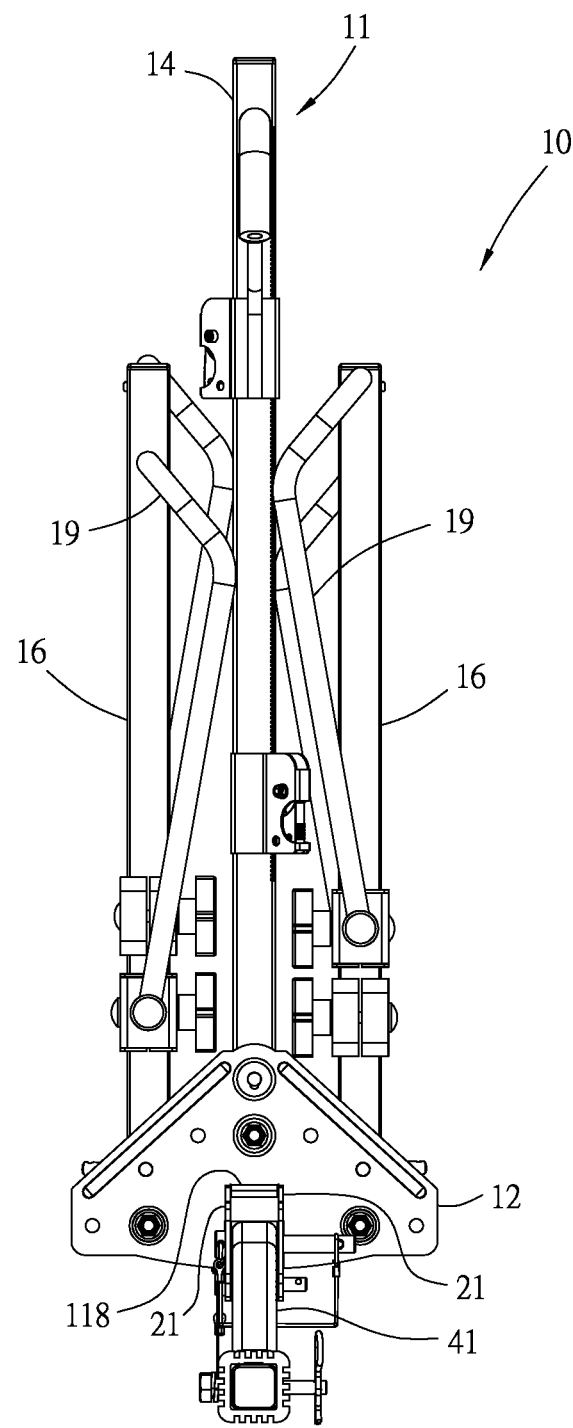
FIG. 2 is a right side view of the first exemplary embodiment of the present disclosure.
Figure 3:
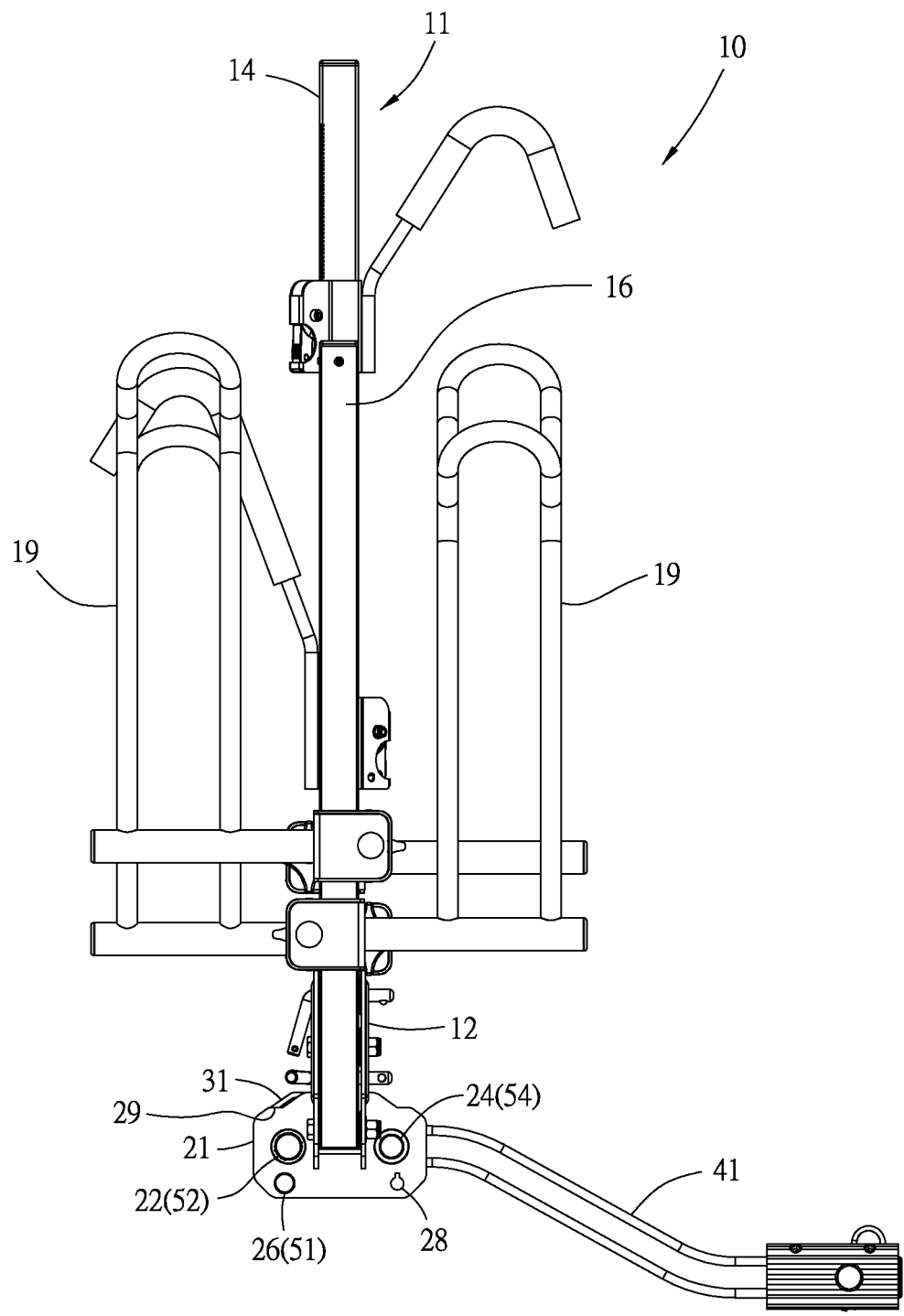
FIG. 3 is a front view of the first exemplary embodiment of the present disclosure.

In order to illustrate the technical features of the present disclosure in detail, the following exemplary embodiments are cited and illustrated with accompanying drawings, among others.

As shown in FIGS. 1 to 8, a bicycle carrier 10 having a tilt buffering apparatus according to a first exemplary embodiment includes a frame body 11, two position plates 21, a buffer portion 31, a connecting rod 41 and a fastening bolt 51. Specifically, the frame body 11 has a plurality of carriers 19 for carrying and fixing at least one bicycle (not shown).

The position plates 21 are affixed to the bottom of the frame body 11 in a position opposite to each other at a predetermined distance. Specifically, each of the position plates 12 is pivotally positioned in a pairwise opposing manner, and has a connecting hole 22, a positioning hole 24 and a fixing hole 26.

Figure 4:
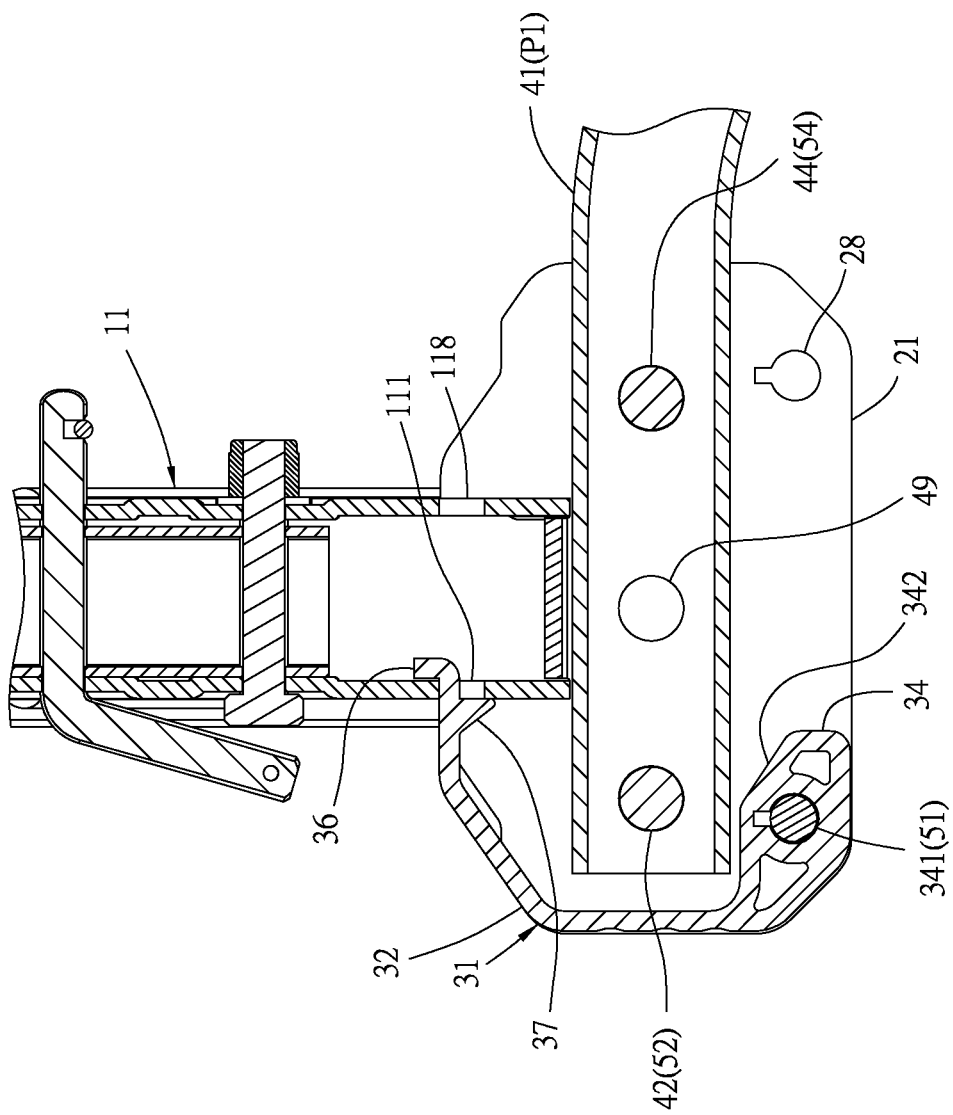
FIG. 4 is a schematic cross-sectional view of the first exemplary embodiment of the present disclosure, showing the state of the use position.

The buffer portion 31 has an elongated body part 32 that includes a buffer block 34 and a temporary fixing part 36. The buffer block 34 has a through hole 341, and the buffer portion 31 is detachably located between the position plates 21. Additionally, the buffer portion 31 is positioned by aligning the fixing holes 26 of the position plates 21 with the through holes 341, the temporary fixing portion 36 is detachably affixed to the frame body 11, and the buffer block 34 has an inclined surface 342. In the first exemplary embodiment, the frame body 11 has a hollow part 111, and the temporary fixing part 36 of the buffer portion 31 is in the shape of a hook, with the temporary fixing part 36 passing through the hollow part 111 to hook onto the frame body 11. Also in the first exemplary embodiment, an abutting block 37 is arranged on the buffer portion 31. When the temporary fixing part 36 hooks onto the frame body 11, the abutting block 37 does not pass through the hollow part 111. As shown in FIG. 4, the abutting block 37 and the temporary fixing part 36 are located on opposite sides of the hollow part 111.

The connecting rod 41 has a rod pivot hole 42, which is located between the position plates 21. A pivot pin 52 passes through the connecting holes 22 of the position plates 21 and the rod pivot hole, thereby allowing the connecting rod 41 to be pivoted therebetween relatively to the two position plates 21. Additionally, the connecting rod 41 includes a rod positioning hole 44.

The fastening bolts 51 are detachably penetrated through the fixing holes 26 of the two position plates 21, as well as the through holes 341 of the buffer portion 31.

Specifically, the frame body 11 and position plates 21 are operated to swivel relative to the connecting rod 41 so that the frame body 11 is located at a use position P1 or in a tilted position P2 relative to the two position plates 21. When the frame body 11 is in the use position P1, the rod positioning hole 44 of the connecting rod 41 faces the positioning holes 24 of the two position plates 21, with a positioning pin 54 passing therethrough for positioning. After positioning, the frame body 11 and the position plates 21 cannot swing relative to the connecting rod 41. As such, the inclined surface 342 of the buffer block 34 is separated from the connecting rod 41 by a predetermined distance and does not touch. When the frame body 11 is located at the tilted position P2, the buffer block 34 is pressed against the connecting rod 41 by way of the inclined surface 342.

The above-discussed structure provides a buffering function between the frame body 11 and connecting rod 41. The buffering function is described further below.

As shown in FIG. 4, when in use, the connecting rod 41 is first set on a connecting bar of a vehicle. Since this set up has been widely seen in the prior art, it can be easily understood by those skilled in the art. Therefore, the vehicle and the connecting bar of the vehicle are not shown in FIG. 4. In the connected state, the connecting rod 41 is generally in a horizontal state. During the normal use state, the frame body 11 is located at the use position P1 and can carry the bicycle (not shown) by the plurality of carriers 19. At the same time, the rod pivot hole 42 of the connecting rod 41 is aligned with the pivot holes 22 of the position plates 21, and is positioned by the pivot pin 52 passing therethrough. Also, the rod positioning hole 44 of the connecting rod 41 is aligned with the positioning hole 24 of the second positioning plate 21, and positioned by the positioning pin 54. In this case, the frame body 11 and the position plates 21 cannot swing relative to the connecting rod 41, and are in a fixed position. In addition, the temporary fixing part 36 of the buffer portion 31 passes through the hollow part 111 and hooks onto the frame body 11, and the buffer block 34 is passed through the fastening bolt 51 for positioning thereof.

Figure 5:
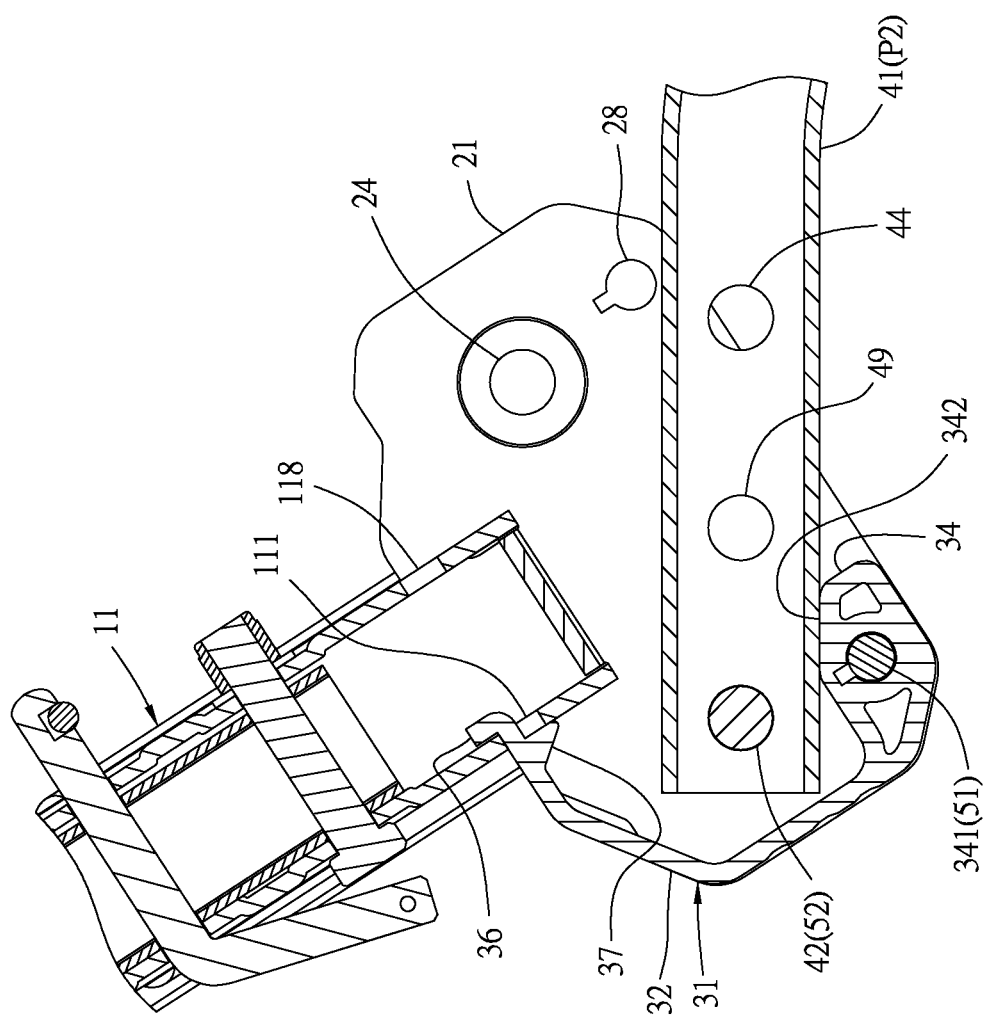
FIG. 5 is another schematic cross-sectional view of the first exemplary embodiment of the present disclosure, showing the state of the tilted position.

As shown in FIG. 5, if the user wants to access items in the rear compartment of the vehicle, the user needs to move the frame body 11 and position plates 21 to the tilted position P2, so as to make room for accessing the items. To move, the user only needs to remove the positioning pin 54 and push the frame body 11 away from the rear of the vehicle. During the pushing process, the user can continue holding by hand. The buffer portion 31, being fixed to the position plates 21 and frame body 11, swings with the positioning plate 21 to the tilted position P2. At the tilted position P2, the inclined surface 342 of the buffer block 34 abuts the connecting rod 41. In this situation, the connecting rod 41 does not directly act on the fastening bolt 51, but provides a cushioning effect, thereby providing protection to each component.

In the present embodiment, the buffer block 34 can be formed by aluminum extrusion technology, and when the connecting rod 41 and fastening bolt 51 are made of aluminum, they provide better buffering effect as compared to when they are made of iron or steel by the fact that aluminum is softer than iron and steel.

Figure 7:
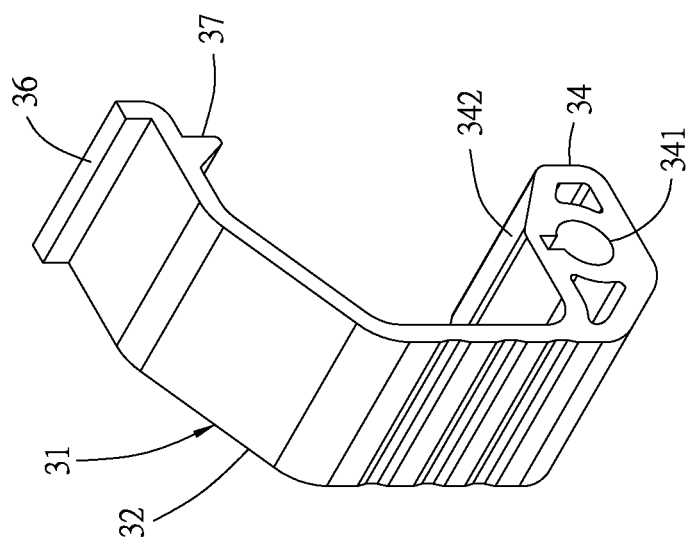
FIG. 7 is a perspective view of some components of the first exemplary embodiment of the present disclosure, showing a buffer portion.

As more specifically shown in FIG. 7, the buffer portion 31 is a cushion that provides buffering when the bicycle carrier frame is inclined, and the body part 32 therein can be set in a zigzag and elongated manner, with the axial direction of the through hole 341 in perpendicular to the extending direction of the body 32, and the extending direction of the inclined surface 342 in parallel to the axial direction of the through hole 341.

Figure 8:
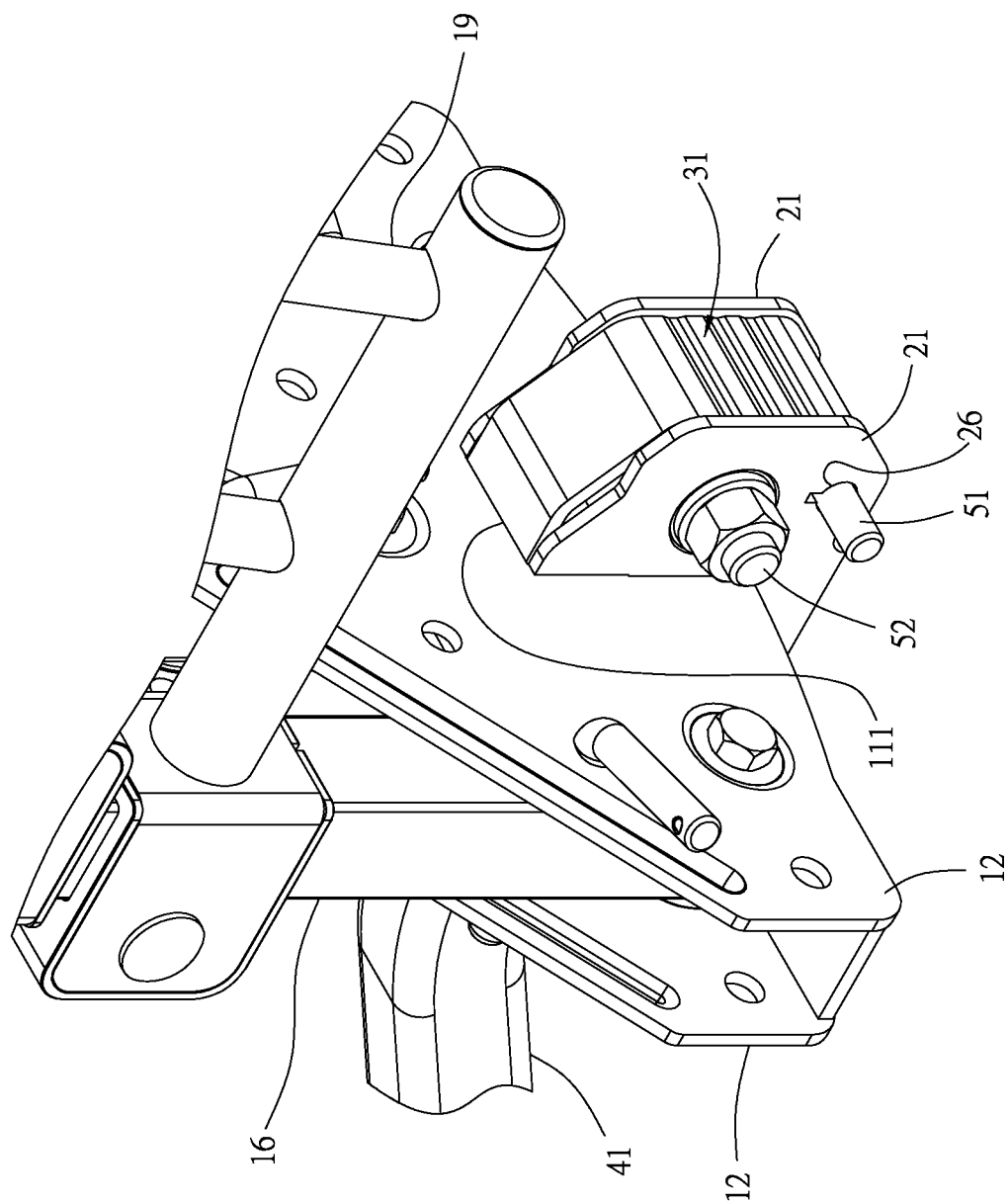
FIG. 8 is a partial enlarged view of the first exemplary embodiment of the present disclosure, showing another viewing angle.
Figure 9:
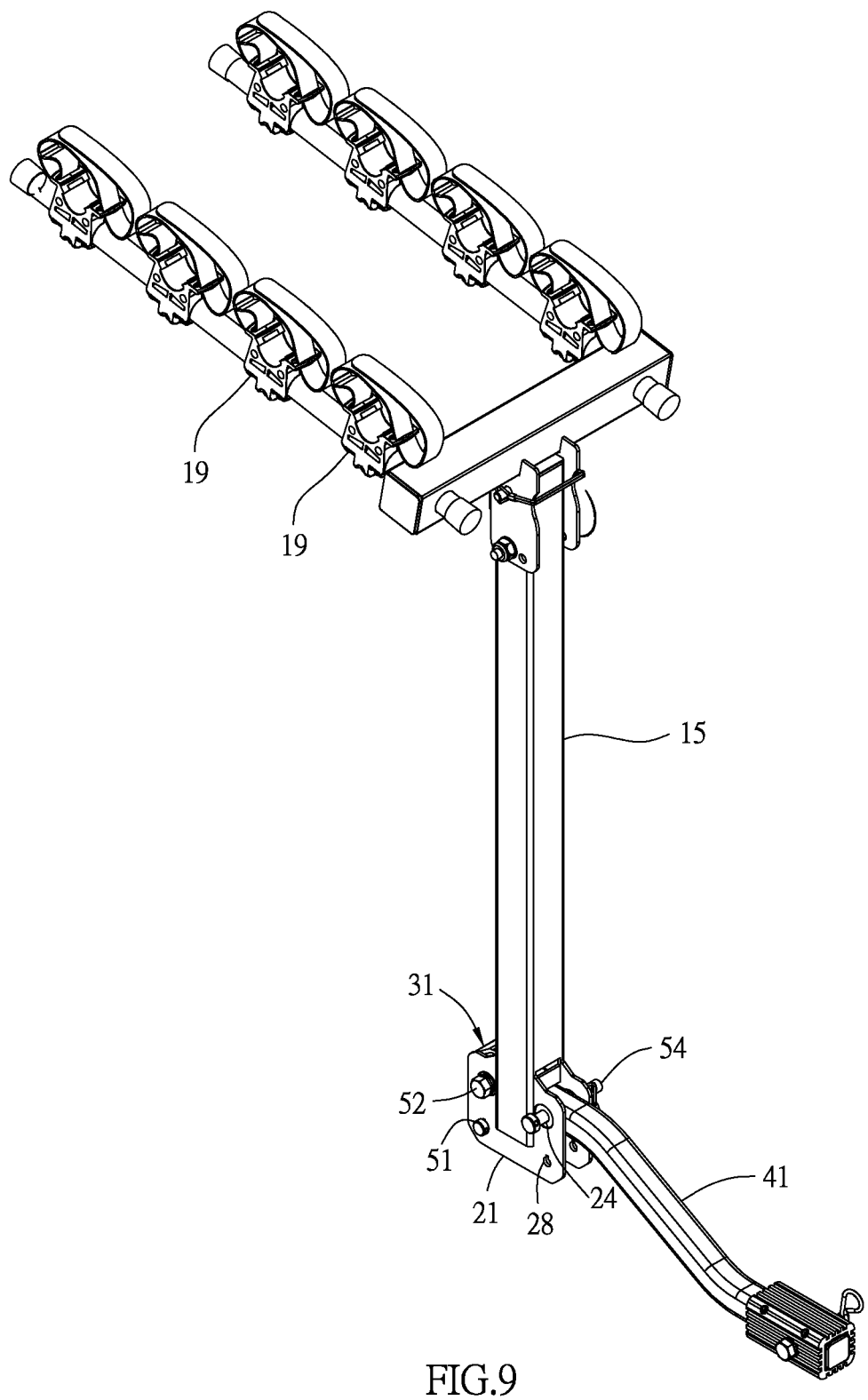
FIG. 9 is another perspective view of the first exemplary embodiment of the present disclosure, showing the state of assembling the frame body.

In addition, in the present exemplary embodiment as shown in FIGS. 1 and 8, the frame body 11 is a combination of two assembly plates 12 along with a main rod 14 having two side rods 16. The assembly plates 12 constitute a base, and are affixed to the position plates 21, with the carriers 19 arranged on each of the two side rods 16. For other structures, such as shown in FIG. 9, the frame body 11 has a main bar 15, and the main bar 15 is directly disposed on the two position plates 21. The main bar 15 is directly connected to the two position plates 21, with the top end of the main bar 15 bent to accommodate the carriers 19.

In the foregoing description, only the conditions of the frame body 11 in the use position P1 and tilted position P2 are described. Still, if the user does not want either position, the buffer portion 31 can also be stored between the position plates 21, with the specific structure described as follows.

Figure 6:
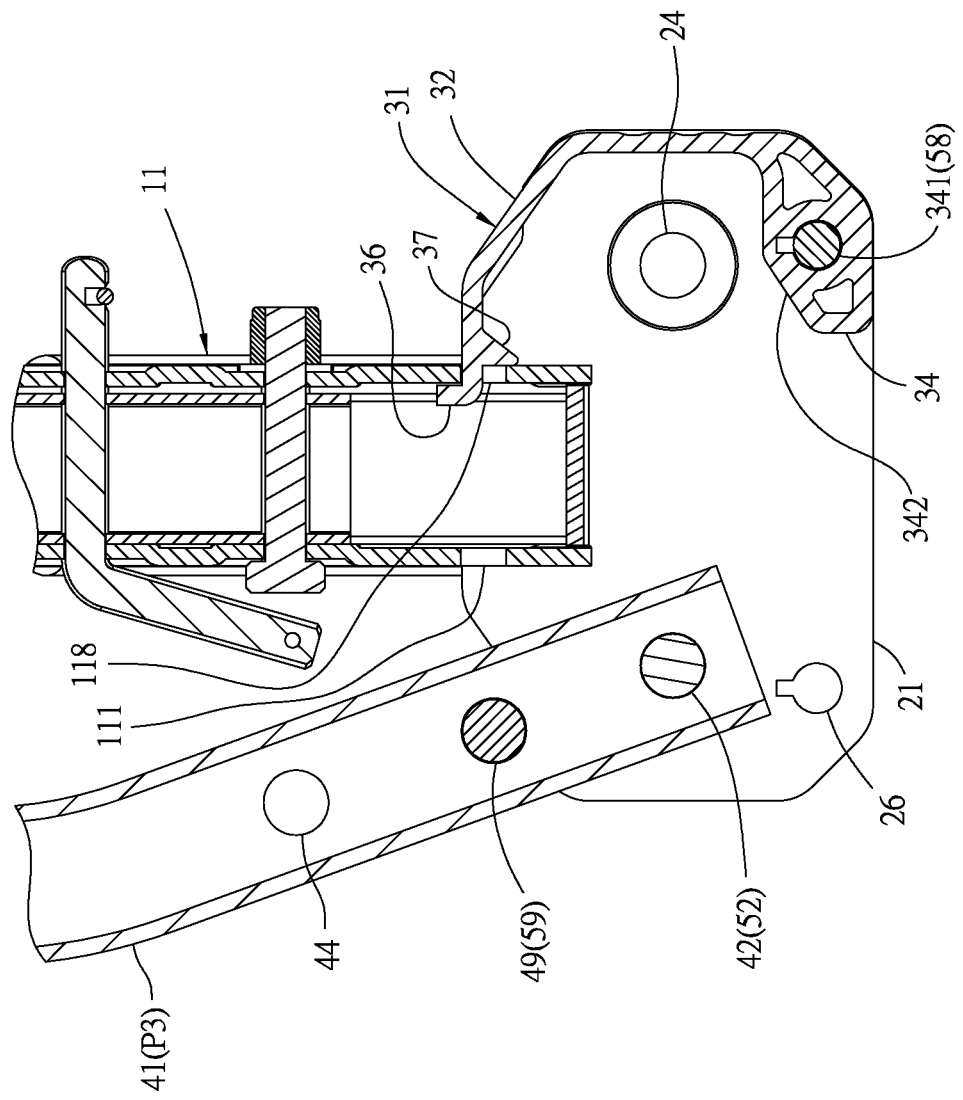
FIG. 6 is another schematic cross-sectional view of the first exemplary embodiment of the present disclosure, showing the state of the stowed position.

As shown in FIG. 6, when not in use, the connecting rod 41 can be removed from the connecting bar of the vehicle. The position plates 21 are opposite to each other, with a part of their edges as an interference portion 29, the connecting rod 41 has a temporary fixing hole 49, and can be swiveled to a stowed position P3 against the frame body 11 and the two position plates 21 by operation. When the connecting rod 41 is located at the stowed position P3, a plug 59 is inserted into the temporary fixing hole 49. The plug 59 interferes with the interference portion 29 of the position plates 21, thereby fixing the connecting rod 41 in the stowed position P3.

In addition, the two position plates 21 are each provided with a stowed hole 28, and located opposite to each other. The frame body 11 is correspondingly provided with a receiving hollow part 118. When the connecting rod 41 is located at the receiving position P3, the through hole 341 of the buffer block 34 is aligned with the stowed hole 28 of the two position plates 21. A stowed pin 58 passes through the stowed holes 28 of the two position plates 21 and the through hole 341 of the buffer block 34. The temporary fixing part 36 of the buffer portion 31 passes through the receiving hollow part 118 to hook the frame body 11, and is then received between the two position plates 21.

With the above structure, the buffer portion 31 can also be accommodated between the position plates 21 when not in use, so as to allow convenient access by the user at any time.

As shown in FIGS. 10 to 13, the present disclosure provides a bicycle carrier 10' with a tilt buffering apparatus according to the second preferred embodiment, which is basically the same as the first embodiment disclosed above, except for the differences as discussed below.

Figure 10:
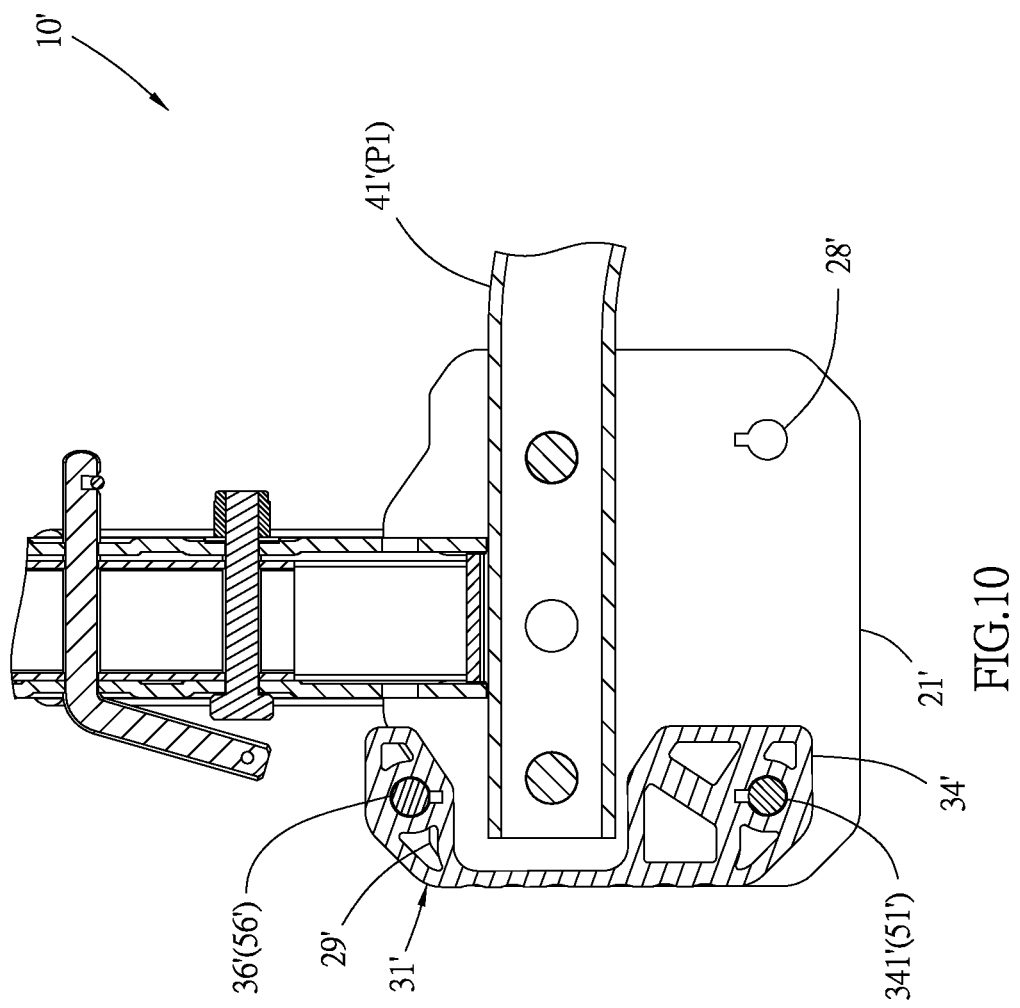
FIG. 10 is a schematic cross-sectional view of the second exemplary embodiment of the present disclosure, showing the state of the use position.
Figure 11:
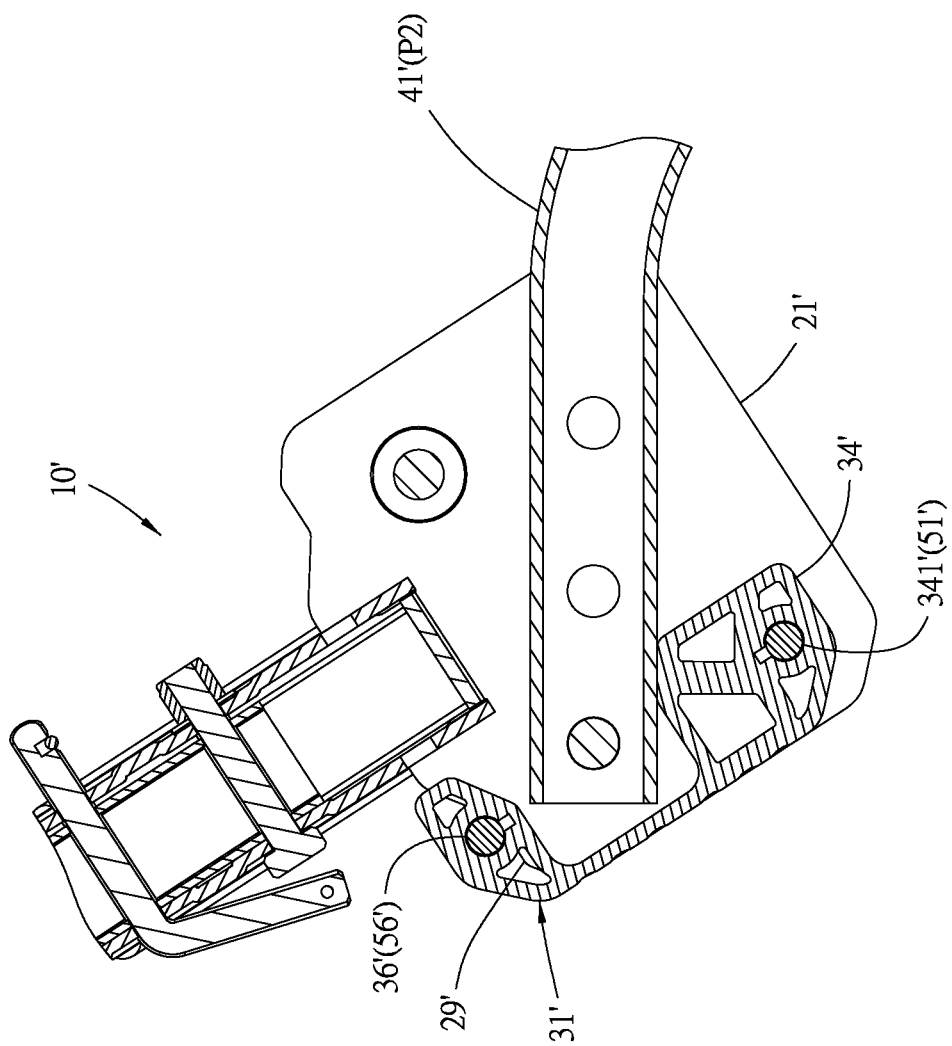
FIG. 11 is another schematic cross-sectional view of the second exemplary embodiment of the present disclosure, showing the state of the tilted position.

As shown in FIGS. 10 and 11, a temporary fixing part 36' of a buffer portion 31' is a perforated hole instead of a hook, and a temporary fixing portion 36' is allows a temporary fixing pin 56' to pass through. When a connecting rod 41' is not located at the stowed position P3, that is, when the connecting rod 41' is located in the use position P1 or the tilted position P2, the temporary fixing pin 56' is detachably fixed to an interference portion 29' of position plates 21'. In this second exemplary embodiment, the temporary fixing portion 56' is removably fixed to the interference portion 29' of the positioning plate 21'. Also in the second embodiment, when the temporary fastening bolt 56' is inserted into the temporary fixing part 36', the interfering portion 29' of the position plates 21' is pressed against the interference portion 29' of the position plates 21'. The interference portion 29' is the edges of the two position plates 21'. After the temporary fixing pin 56' is pulled out, the interference portion 29' of the position plates 21' is no longer pressed, and the fixed state is released.

Figure 12:
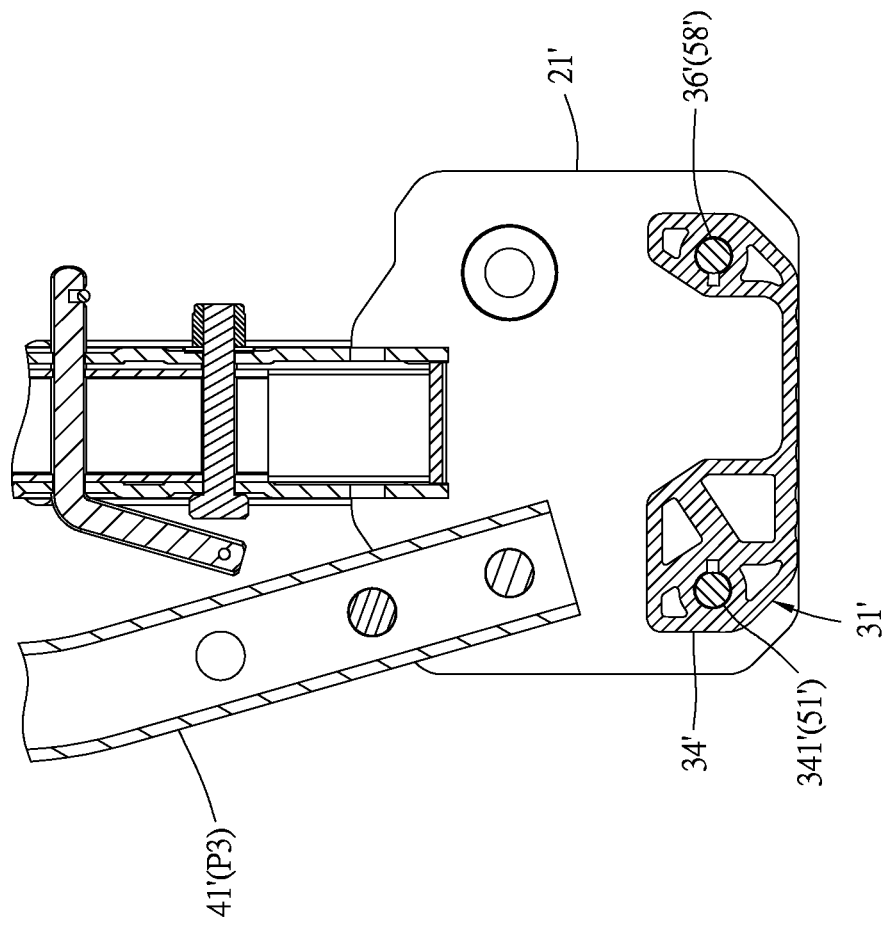
FIG. 12 is another cross-sectional schematic diagram of the second exemplary embodiment of the present disclosure, showing one state of the stowed position.

As shown in FIG. 12, when the buffer portion 31' in not in use and the user wants to store the buffer portion 31', the connecting rod 41' is swung to the stowed position P3, and a buffer block 34' is also swung to the stowed position P3. A through hole 341' is aligned with fixing holes 26' of the position plates 21' (see FIG. 13), and then a fastening bolt 51' is passed through for positioning. The temporary fixing part 36' is aligned with a stowed hole 28' of the position plates 21' (see in FIG. 10), and a stowed pin 58' is positioned to pass through. As such, the buffer portion 31' can be accommodated between the position plates 21'.

Figure 13:
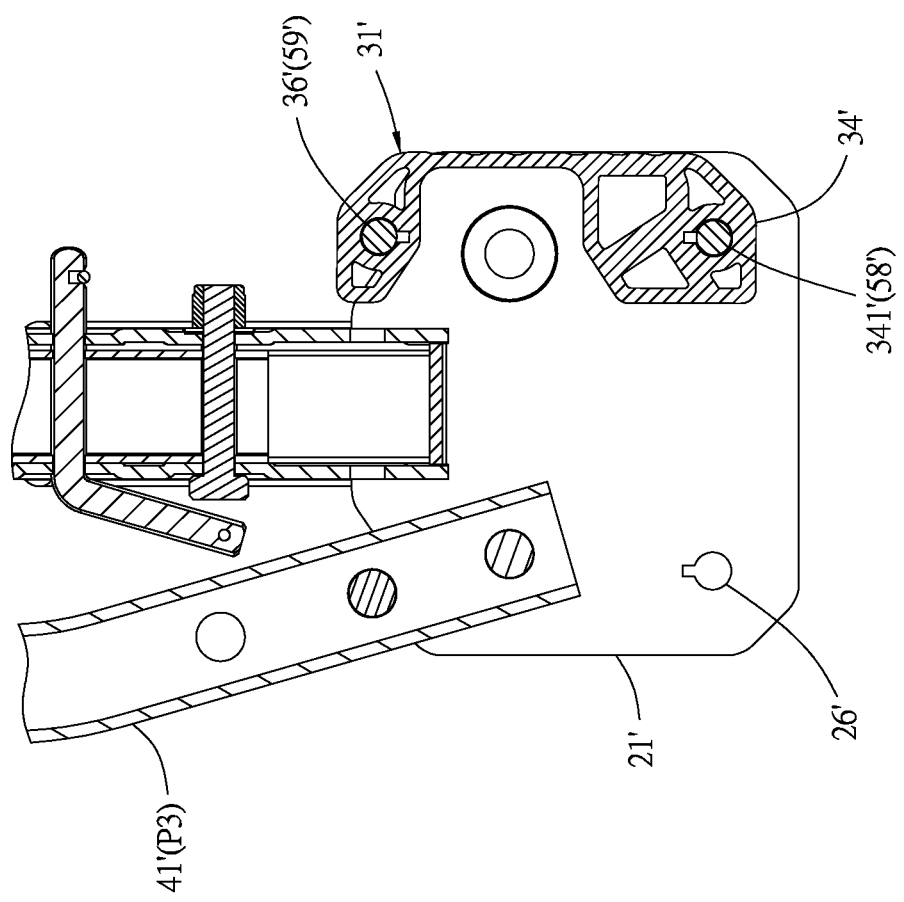
FIG. 13 is yet another cross-sectional schematic diagram of the second exemplary embodiment of the present disclosure, showing another state of the stowed position.

As shown in FIG. 13, when the buffer portion 31' is not in use and the user wants to store the buffer portion 31', the connecting rod 41' is swung to the stowed position P3 to place the buffer block 34'. The through hole 341' of the buffer block 34' is aligned with stowed hole 28' of the position plates 21' (see FIG. 10), and then the stowed pin 58' is passed through for positioning. The temporary fixing part 36' is also inserted with the plug 59' to interfere with the edges of the two position plates 21', and are in a state similar to FIG. 10 but on the other side. In this way, the buffer portion 31' can also be accommodated between the two position plates 21'.

The rest of the structure of the second exemplary embodiment and the effects that can be achieved are generally the same as the first exemplary embodiment disclosed above, and therefore will not be repeated.

The present disclosure has been described with reference to the exemplary embodiments, and such description is not meant to be construed in a limiting sense. It should be understood that the scope of the present disclosure is not limited to the above-mentioned embodiment, but is limited by the accompanying claims. It is, therefore, contemplated that the appended claims will cover all modifications that fall within the true scope of the present disclosure. Without departing from the object and spirit of the present disclosure, various modifications to the embodiments are possible, but they remain within the scope of the present disclosure, will be apparent to persons skilled in the art.

What is claimed is:

1. A bicycle carrying frame with a tilt buffering apparatus, comprising:
   a frame body with at least one carrier, which is used for carrying and fixing at least one bicycle;
   a pair of position plates having a connecting hole, a positioning hole and a fixing hole mounted on the bottom of the frame body, positioned opposite to one another, and separated by a predetermined distance;
   a buffer portion having an elongated body, with the elongated body having a buffer block and a temporary fixing part, whereby the buffer block has a through hole, the buffer portion is detachably located between the position plates, the through hole is aligned with the fixing hole of the two position plates, the temporary fixing portion is detachably fixed to the frame body or the position plates, and the buffer block has an inclined surface;

a connecting rod having a rod pivot hole and a rod positioning hole, whereby a part of the connecting rod with the rod pivot hole is located between the position plates, and a pivot pin passes through the connecting hole of the position plates and the rod pivot hole, so that the connecting rod can be pivoted between the position plates; and a fastening bolt detachably penetrating the fixing hole of the position plates and passing through the through holes of the buffer block, wherein the frame body and the position plates are operated to swing relative to the connecting rod, so that the connecting rod is located in a use position or a tilted position relative to the two position plates, wherein at the use position, the rod positioning hole of the connecting rod is opposite to the positioning hole of the pair of the position plates, and fixed by a positioning pin passing therethrough, so that the frame body and the two positioning plates cannot swing relative to the connecting rod, and at the same time, the inclined surface of the buffer block is separated without contact from the connecting rod by a predetermined distance, and wherein when the connecting rod is at the tilted position, the buffer block is pressed against the connecting rod on the inclined surface.

2. The bicycle carrying frame with the tilt buffering apparatus according to claim 1, wherein the frame body has a hollow part, a temporary fixing part of the buffer portion is in the shape of a hook, and the temporary fixing part is hooked onto the frame body through the hollow part.

3. The bicycle carrying frame with the tilt buffering apparatus according to claim 2, wherein, the buffer portion has an abutting block which does not pass through the hollow part, and rests on the frame body when the temporary fixing portion is hooked onto the frame body, and the abutting block is located on the sides of the hollow part separately from the temporary fixing portion.

4. The bicycle carrying frame with the tilt buffering apparatus according to claim 1, wherein the pair of position plates are each provided with an interference portion that is opposite to one another, the connecting rod has a temporary fixing hole, and the connecting rod is operable to swing to a stowed position relative to the frame body and the positioning plates, and wherein when the rod is in the stowed position, the temporary fixing hole is inserted with a plug which interferes with the interference portion of the position plates.

5. The bicycle frame with the tilt buffering apparatus according to claim 4, wherein at least one edge of the two position plates is used as the interference portion.

6. The bicycle frame with the tilt buffering apparatus according to claim 5, wherein the temporary fixing portion of the buffer portion is a through hole for a temporary fixing pin to pass through, and the temporary fixing pin is detachably fixed to the interference portion of the positioning plates when the connecting rod is not in the stowed position.

7. The bicycle frame with the tilt buffering apparatus according to claim 1, wherein the position plates that are opposite to each other are provided with a stowed hole.

8. The bicycle carrying frame with the tilting buffer portion according to claim 7, wherein the frame body has a hollow part, and when the through hole of the buffer block is aligned with the stowed hole of the positioning plates, a stowed pin is passed through the stowed hole of the positioning plates and the through hole of the buffer block, and the temporary fixing part of the buffer portion is passed through the hollow part and hooked onto the frame body.

* * * * *